(12) United States Patent
Nagamatsu

(10) Patent No.: US 10,511,972 B2
(45) Date of Patent: Dec. 17, 2019

(54) COMMUNICATION APPARATUS, COMMUNICATION METHOD, AND PROGRAM

(71) Applicant: SONY CORPORATION, Tokyo (JP)

(72) Inventor: Tatsuo Nagamatsu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 186 days.

(21) Appl. No.: 15/308,637

(22) PCT Filed: Mar. 20, 2015

(86) PCT No.: PCT/JP2015/058445
§ 371 (c)(1),
(2) Date: Nov. 3, 2016

(87) PCT Pub. No.: WO2015/198660
PCT Pub. Date: Dec. 30, 2015

(65) Prior Publication Data
US 2017/0188238 A1    Jun. 29, 2017

(30) Foreign Application Priority Data
Jun. 27, 2014    (JP) .................... 2014-132853

(51) Int. Cl.
*H04W 12/08* (2009.01)
*H04L 29/06* (2006.01)
(Continued)

(52) U.S. Cl.
CPC ........... *H04W 12/08* (2013.01); *H04L 9/3236* (2013.01); *H04L 63/0281* (2013.01);
(Continued)

(58) Field of Classification Search
CPC .......... G06F 1/14; G06F 1/162; G06F 3/0304; G06F 17/30241; H04L 63/107; H04L 63/0208
See application file for complete search history.

(56) References Cited

U.S. PATENT DOCUMENTS

2007/0038950 A1* 2/2007 Taniguchi .............. G01C 21/26
  715/768
2008/0242278 A1 10/2008 Rekimoto
(Continued)

FOREIGN PATENT DOCUMENTS

GB      201219206    *  9/2013   ........... H04L 9/3228
JP      2002-300651 A    10/2002
(Continued)

OTHER PUBLICATIONS

International Search Report dated May 19, 2015 in PCT/JP2015/058445.

*Primary Examiner* — Ashokkumar B Patel
*Assistant Examiner* — William B Jones
(74) *Attorney, Agent, or Firm* — Xsensus LLP

(57) ABSTRACT

[Object] To provide a communication apparatus, a communication method, and a program, each of which is capable of achieving both security and convenience of communication in transmission of information.
[Solution] A communication apparatus, including: an acquisition unit configured to acquire information on a position or external environment of the communication apparatus; and a control unit configured to control transmission of information containing first identification information of the communication apparatus in the case where the information acquired by the acquisition unit satisfies a predetermined condition. A communication method, including: acquiring information on a position or external environment of a communication apparatus; and controlling transmission of information containing first identification information of the communication apparatus in the case where the acquired information satisfies a predetermined condition.

20 Claims, 10 Drawing Sheets

(51) Int. Cl.
*H04W 4/02* (2018.01)
*H04W 12/06* (2009.01)
*H04L 9/32* (2006.01)
*H04W 12/00* (2009.01)
*G06F 1/14* (2006.01)
*G06F 21/34* (2013.01)

(52) U.S. Cl.
CPC ........ *H04L 63/0853* (2013.01); *H04L 63/107* (2013.01); *H04W 4/023* (2013.01); *H04W 12/003* (2019.01); *H04W 12/06* (2013.01); *G06F 1/14* (2013.01); *G06F 21/34* (2013.01); *G06F 2221/2111* (2013.01); *H04W 12/00503* (2019.01)

(56) References Cited

U.S. PATENT DOCUMENTS

| | | | | |
|---|---|---|---|---|
| 2009/0204354 | A1* | 8/2009 | Davis | H04W 84/18 |
| | | | | 702/89 |
| 2013/0201316 | A1* | 8/2013 | Binder | H04L 67/12 |
| | | | | 348/77 |

FOREIGN PATENT DOCUMENTS

| | | | |
|---|---|---|---|
| JP | 2008-252298 | A | 10/2008 |
| JP | 2010-245782 | A | 10/2010 |
| JP | 2011-182407 | A | 9/2011 |

* cited by examiner

FIG. 1
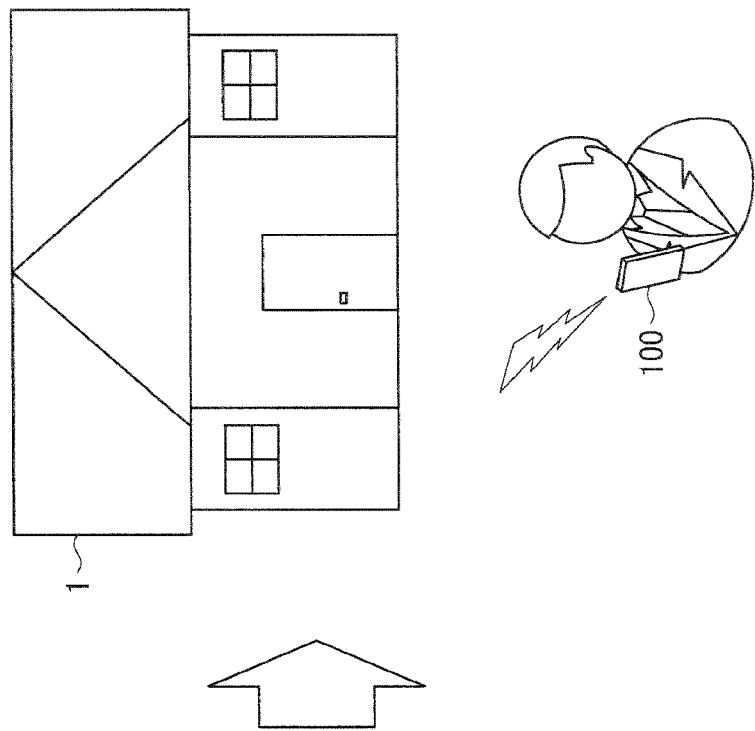
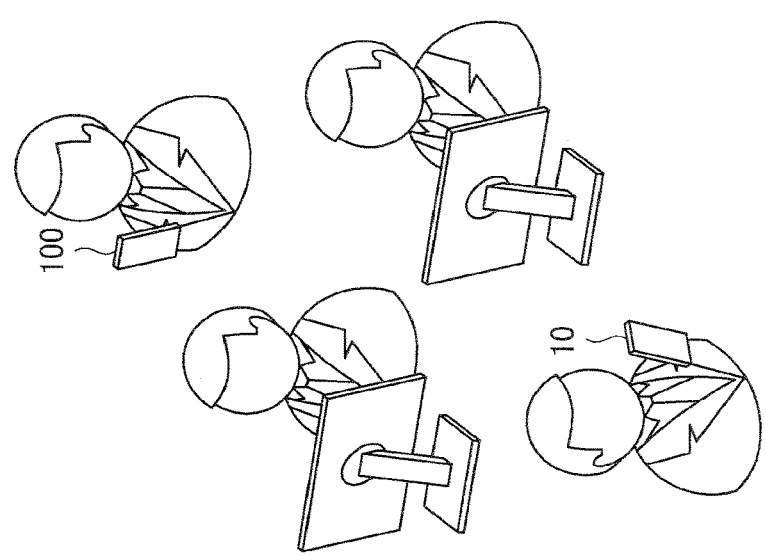

COMMUNICATION APPARATUS, COMMUNICATION METHOD, AND PROGRAM

TECHNICAL FIELD

The present disclosure relates to a communication apparatus, a communication method, and a program.

BACKGROUND ART

In recent years, a portable communication apparatus has been developed and productized in accordance with development of an information communication technology. However, in many cases, such a portable communication apparatus performs wireless communication that is in the risk of, for example, interception of communication. Therefore, it has been increasingly required to ensure security of communication in accordance with spread of portable communication apparatuses.

In response to this, for example, Patent Literature 1 discloses a communication apparatus that automatically establishes communication connection using authentication with an electronic device serving as a communication partner, generates a passkey such as a character string to be shared with the electronic device, and communicates with the electronic device by using the passkey.

CITATION LIST

Patent Literature

Patent Literature 1: JP 2011-182407A

SUMMARY OF INVENTION

Technical Problem

However, such an invention disclosed in Patent Literature 1 presupposes that communication connection is performed between the electronic device and the communication apparatus by using authentication, and therefore, in the case where it is desired to perform communication in which communication connection using authentication is unnecessary, it is difficult to perform communication in consideration of security.

In view of this, the present disclosure proposes a communication apparatus, a communication method, and a program, each of which is new, improved, and capable of achieving both security and convenience of communication in transmission of information.

Solution to Problem

According to the present disclosure, there is provided a communication apparatus, including: an acquisition unit configured to acquire information on a position or external environment of the communication apparatus; and a control unit configured to control transmission of information containing first identification information of the communication apparatus in the case where the information acquired by the acquisition unit satisfies a predetermined condition.

According to the present disclosure, there is provided a communication apparatus, including: a communication unit configured to communicate with another communication apparatus; and a control unit configured to control transmission of information containing first identification information of the communication apparatus on the basis of communication with the other communication apparatus. The other communication apparatus acquires information on a position or external environment of the other communication apparatus and performs predetermined communication with the communication apparatus in the case where the acquired information satisfies a predetermined condition.

According to the present disclosure, there is provided a communication method, including: acquiring information on a position or external environment of a communication apparatus; and controlling transmission of information containing first identification information of the communication apparatus in the case where the acquired information satisfies a predetermined condition.

According to the present disclosure, there is provided a program for causing a computer to realize: an acquisition function of acquiring information on a position or external environment of a communication apparatus; and a control function of controlling transmission of information containing first identification information of the communication apparatus in the case where the information acquired by the acquisition function satisfies a predetermined condition.

Advantageous Effects of Invention

As described above, the present disclosure provides a communication apparatus, a communication method, and a program capable of achieving both security and convenience of communication in transmission of information. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is a diagram for describing an outline of a communication apparatus according to an embodiment of the present disclosure.

DESCRIPTION OF EMBODIMENT(S)

Figure 2:
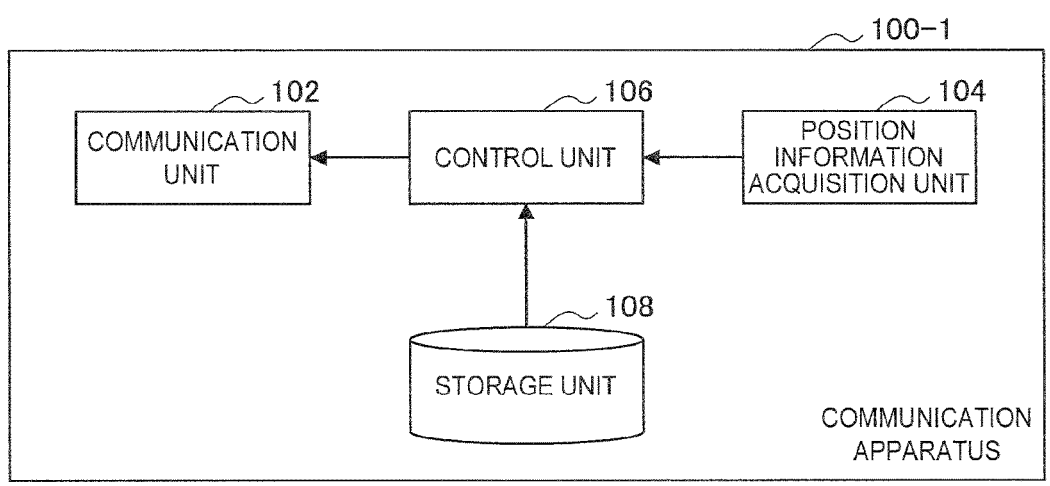
FIG. 2 is a block diagram showing a schematic functional configuration of a communication apparatus according to a first embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.

1. Outline of communication apparatus according to embodiment of present disclosure
2. First embodiment (example of operation of communication apparatus alone)
  2-1. Configuration of communication apparatus
  2-2. Processing of communication apparatus
  2-3. Modification examples
3. Second embodiment (example of operation in state of connection with another communication apparatus)
  3-1. Configurations of communication apparatuses
  3-2. Processing of communication apparatus
  3-3. Modification example
4. Hardware configuration of communication apparatus according to embodiment of present disclosure
5. Conclusion

1. OUTLINE OF COMMUNICATION APPARATUS ACCORDING TO EMBODIMENT OF PRESENT DISCLOSURE

An outline of a communication apparatus according to an embodiment of the present disclosure will be described with reference to FIG. 1. FIG. 1 is a diagram for describing the outline of the communication apparatus according to the embodiment of the present disclosure.

The communication apparatus according to the embodiment of the present disclosure is a portable communication terminal having a wireless communication function. By using the wireless communication function, communication connection with another communication apparatus is established and transmission/reception of information to/from the other communication apparatus is performed. Further, by using the wireless communication function, transmission of information to another unspecified communication apparatus, in which establishment of communication connection with another communication apparatus is unnecessary, is performed.

For example, a communication apparatus 100 according to the embodiment of the present disclosure can establish communication connection with another communication apparatus 10 shown in the left drawing of FIG. 1 and transmit/receive information to/from the other communication apparatus 10. In the case where the communication apparatus 100 does not establish communication connection with the other communication apparatus 10, the communication apparatus 100 regularly transmits information to another unspecified communication apparatus.

Herein, generally, information to be transmitted to another unspecified communication apparatus contains identification information capable of specifying a transmission source. Therefore, a position of a communication apparatus serving as a transmission source of information may be traced by collecting the identification information. On the contrary, in the case where the information containing the identification information is not transmitted, the information is not received even by another communication apparatus that is allowed to acquire the identification information, and therefore convenience is lost in some cases. Further, the use of an existing communication specification for privacy protection is also considered. However, implementation of the communication specification is arbitrary, and therefore, in the case where the communication specification is not implemented in another communication apparatus, it is difficult to use the communication specification. In view of this, the communication apparatus 100 according to the embodiment of the present disclosure acquires information on a position or external information of the communication apparatus 100 and controls transmission of the information containing the identification information of the communication apparatus 100 in the case where the acquired information satisfies a predetermined condition.

For example, in the case where position information of the communication apparatus 100 is acquired and a position indicated by the acquired position information falls within a predetermined geographical range, the communication apparatus 100 transmits the information containing the identification information of the communication apparatus 100.

Specifically, as shown in the left drawing of FIG. 1, in the case where the communication apparatus 100 positions in, for example, a building that is an office of a user of the communication apparatus 100, the communication apparatus 100 determines that the position indicated by the acquired position information does not fall within a predetermined area, the communication apparatus 100 stops transmission of the information containing the identification information of the communication apparatus 100. Meanwhile, in the case where the communication apparatus 100 positions, for example, in the vicinity of a house of the user of the communication apparatus 100, the communication apparatus 100 determines that the position indicated by the acquired position information falls within the predetermined area and transmits the information containing the identification information.

As described above, the communication apparatus 100 according to the embodiment of the present disclosure acquires information on a position or external information of the communication apparatus 100 and controls transmission of information containing identification information of a communication apparatus 100-1 in the case where information acquired by an acquisition unit satisfies a predetermined condition. Thus, the information containing the identification information can be transmitted in the case where security of communication is high as compared with other statuses, and therefore it is possible to achieve both security and convenience of communication. Note that, although FIG. 1 shows a smartphone as an example of the communication apparatus 100, the communication apparatus 100 may be a portable communication terminal such as a tablet terminal, a wristband having a communication function, a portable game console, or a personal digital assistant (PDA). For convenience of explanation, the communication apparatuses 100 according to the first and second embodiments are differentiated by adding numbers corresponding to embodiments to the end of the reference sign, such as a communication apparatus 100-1 and a communication apparatus 100-2.

2. FIRST EMBODIMENT (EXAMPLE OF OPERATION OF COMMUNICATION APPARATUS ALONE)

Hereinabove, the outline of the communication apparatus 100 according to the embodiment of the present disclosure has been described. Next, the communication apparatus 100-1 according to a first embodiment of the present disclosure will be described. In the communication apparatus 100-1 according to the present embodiment, transmission of information containing identification information of the communication apparatus 100-1 is controlled by the communication apparatus 100-1 alone.

2-1. Configuration of Communication Apparatus

A configuration of the communication apparatus 100-1 according to the first embodiment of the present disclosure will be described with reference to FIG. 2. FIG. 2 is a block diagram showing a schematic functional configuration of the communication apparatus 100-1 according to the first embodiment of the present disclosure.

As shown in FIG. 2, the communication apparatus 100-1 includes a communication unit 102, a position information acquisition unit 104, a control unit 106, and a storage unit 108.

The communication unit 102 transmits information containing the identification information of the communication apparatus 100-1. Specifically, the communication unit 102 transmits the information containing the identification information in accordance with a state of the communication apparatus 100-1. The state of the communication apparatus 100-1 can be a waiting state or an information transmission state.

More specifically, in the case where the state of the communication apparatus 100-1 is the information transmission state, the communication unit 102 acquires the identification information of the communication apparatus 100-1 stored in the storage unit 108 and regularly transmits information containing the acquired identification information to another communication apparatus. In the case where the state of the communication apparatus 100-1 is the waiting state, the communication unit 102 does not transmit the information containing the identification information. Note that the information containing the identification information is transmitted to another unspecified communication apparatus without establishing communication connection with another communication apparatus.

For example, in the case where the state of the communication apparatus 100-1 is an advertising state corresponding to the information transmission state in accordance with a specification of Bluetooth Low Energy (hereinafter, also referred to as "BLE"), the communication unit 102 can transmit an advertising packet in an advertising channel. In the case where the state of the communication apparatus 100-1 is a standby state corresponding to the waiting state, the communication unit 102 stops transmission of an advertising packet. Note that an advertising packet is regularly transmitted at intervals of about 20 msec to 1 sec.

The identification information of the communication apparatus 100-1 is information that is stored as first identification information in the storage unit 108 and is unique between communication apparatuses. For example, an advertising packet transmitted by the communication apparatus 100-1 contains, as the identification information of the communication apparatus 100-1, a public device address that is unique between communication apparatuses related to BLE. Note that the public device address is stored in the storage unit 108 in advance.

The position information acquisition unit 104 acquires position information of the communication apparatus 100-1 as an acquisition unit. Specifically, the position information acquisition unit 104 regularly acquires position information indicating a position of the communication apparatus 100-1. For example, the position information can be coordinate information, and the position information acquisition unit 104 can be a GPS receiver for receiving coordinate information from a global positioning system (GPS) satellite. Note that acquisition of the position information may be performed when, for example, a user performs predetermined operation.

The position information acquisition unit 104 may presume the position of the communication apparatus 100-1 on the basis of intensity of a radio wave received from another communication apparatus. For example, the position information acquisition unit 104 acquires, via communication, position information on a position of another communication apparatus, the position information having been acquired by the other communication apparatus with the use of a GPS or the like. Further, the position information acquisition unit 104 calculates a distance between the other communication apparatus and the communication apparatus 100-1 on the basis of the intensity of the radio wave in communication with the other communication apparatus. Then, the position of the communication apparatus 100-1 is presumed on the basis of the acquired position information and the calculated distance. Note that the position information acquisition unit 104 may receive, from another communication apparatus that is fixedly placed, information containing position information of the other communication apparatus. In this case, the position information of the communication apparatus 100-1 is acquired without providing a GPS receiver or the like in the communication apparatus 100-1, and therefore it is possible to reduce a cost of the communication apparatus 100-1.

The control unit 106 controls communication of the communication apparatus 100-1. Specifically, in the case where the position information of the communication apparatus 100-1 acquired by the position information acquisition unit 104 satisfies a predetermined condition, the control unit 106 controls transmission of the information containing the identification information of the communication apparatus 100-1. Hereinafter, processing of the control unit 106 will be described more specifically.

(Start of Transmission of Information Containing Identification Information)

First, in the case where position information of the communication apparatus 100-1 is acquired by the position information acquisition unit 104, the control unit 106 determines whether or not the acquired position information satisfies the predetermined condition. For example, in the case where the position information of the communication apparatus 100-1 is acquired by the position information acquisition unit 104, the control unit 106 determines whether or not a position indicated by the acquired position information is matched with a position indicated by geographical information stored in the storage unit 108 or falls within an area indicated by the geographical information.

Then, for example, in the case where it is determined that the position indicated by the position information is matched therewith, the control unit 106 determines whether or not transmission of the information containing the identification information of the communication apparatus 100-1 is currently stopped. For example, the control unit 106 determines whether or not the state of the communication apparatus 100-1 is the waiting state.

In the case where it is determined that transmission of the information containing the identification information is currently stopped, the control unit 106 starts transmission of the information containing the identification information. For example, the control unit 106 makes a transition of the state of the communication apparatus 100-1 to the information transmission state, and, as a result, the communication unit 102 starts transmission of the information containing the identification information of the communication apparatus 100-1. Note that, in the case where it is determined that transmission of the information containing the identification information of the communication apparatus 100-1 is not currently stopped, i.e., in the case where the information is regularly transmitted, the control unit 106 does not perform state transition.

(Stop of Transmission of Information Containing Identification Information)

In the case where it is determined that, for example, the position indicated by the position information is not matched therewith, the control unit 106 determines whether or not the information containing the identification information of the communication apparatus 100-1 is regularly transmitted. For example, the control unit 106 determines whether or not the state of the communication apparatus 100-1 is the information transmission state.

In the case where it is determined that the information containing the identification information is regularly transmitted, the control unit 106 stops transmission of the information containing the identification information. For example, the control unit 106 makes a transition of the state of the communication apparatus 100-1 to the waiting state, and, as a result, the communication unit 102 stops transmission of the information containing the identification information of the communication apparatus 100-1. Note that, in the case where it is determined that the information containing the identification information of the communication apparatus 100-1 is not regularly transmitted, i.e., in the case where transmission of the information is stopped, the control unit 106 does not perform state transition.

As described above, transmission containing the identification information of the communication apparatus 100-1 is performed in accordance with the state of the communication apparatus 100-1, and, in the case where the position information acquired by the position information acquisition unit 104 satisfies the predetermined condition, the control unit 106 controls state transition of the communication apparatus 100-1. Thus, the control unit 106 does not directly perform communication control, and therefore it is possible to reduce a range influenced by a change in communication control and to reduce a working amount and a cost caused by the change. Further, communication control is performed by state transition, and therefore it is possible to conform to a communication specification of, for example, BLE in which a communication mode is prescribed for each state.

The storage unit 108 stores information for use in the processing of the control unit 106. Specifically, the storage unit 108 stores the identification information, geographical information, and the like of the communication apparatus 100-1. For example, the storage unit 108 stores, as the identification information, a public device address applied to the communication apparatus 100-1 in advance and stores, as the geographical information, coordinate information in a GPS such as information including a latitude and a longitude. Note that the geographical information stored in the storage unit 108 may be coordinate information at a single point or may be a group of pieces of coordinate information at a plurality of points showing an area. Further, a plurality of pieces of geographical information can be stored. The geographical information may be stored in the storage unit 108 in advance or may be changed by a user operation or the like on the communication apparatus 100-1.

2-2. Processing of Communication Apparatus

Figure 3:
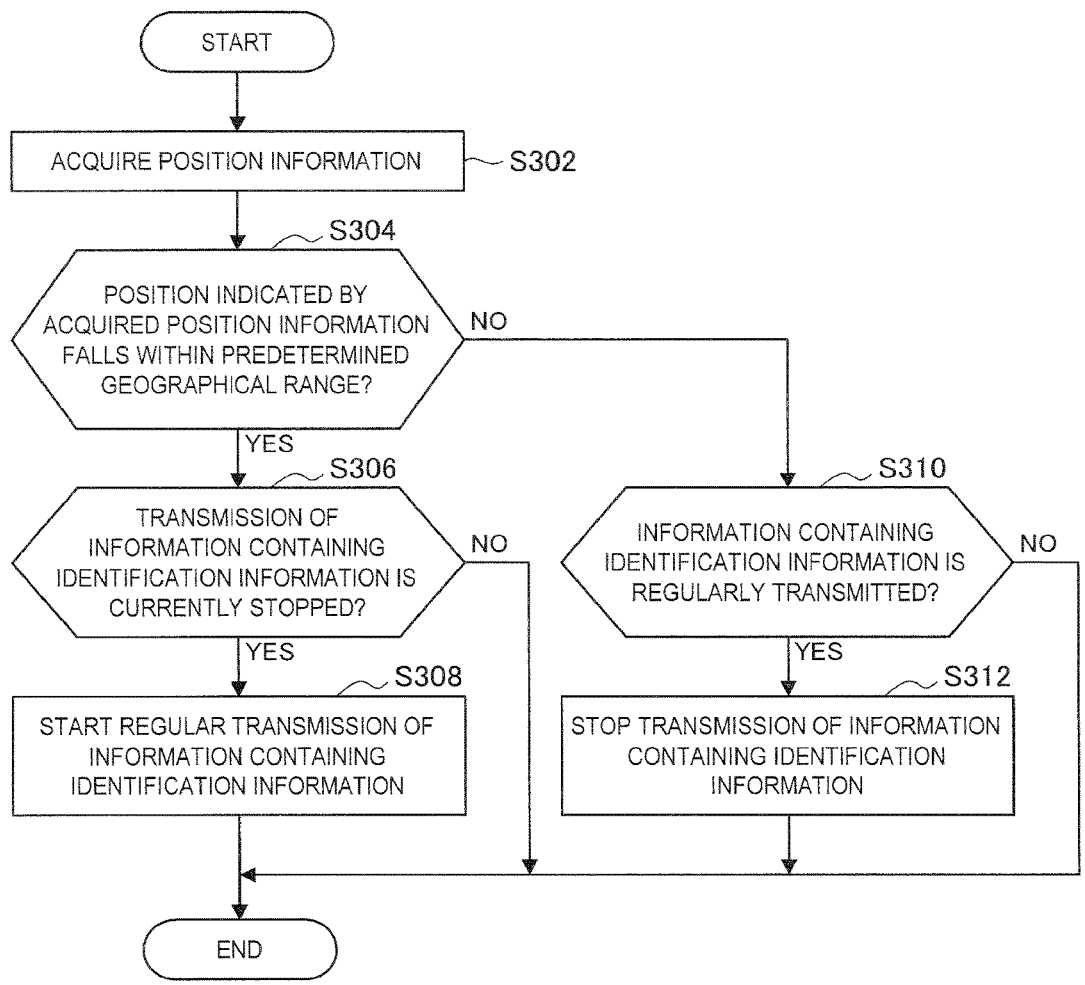
FIG. 3 is a flowchart conceptually showing processing of the communication apparatus in the present embodiment.

Processing of the communication apparatus 100-1 in the present embodiment will be described with reference to FIG. 3. FIG. 3 is a flowchart conceptually showing processing of the communication apparatus 100-1 in the present embodiment.

First, the communication apparatus 100-1 acquires position information of the communication apparatus 100-1 (Step S302). Specifically, the position information acquisition unit 104 regularly acquires the position information indicating a position of the communication apparatus 100-1.

Then, the communication apparatus 100-1 determines whether or not the position indicated by the acquired position information falls within a predetermined geographical range (Step S304). Specifically, in the case where the position information of the communication apparatus 100-1 has been acquired by the position information acquisition unit 104, the control unit 106 determines whether or not the position indicated by the acquired position information falls within an area indicated by geographical information stored in the storage unit 108.

In the case where it is determined that the position indicated by the acquired position information falls within the predetermined geographical range, the communication apparatus 100-1 determines whether or not transmission of the information containing the identification information of the communication apparatus 100-1 is currently stopped (Step S306). Specifically, in the case where it is determined that the position indicated by the acquired position information falls within the area indicated by the geographical information stored in the storage unit 108, the control unit 106 determines whether or not the state of the communication apparatus 100-1 is the waiting state.

In the case where it is determined that transmission of the information containing the identification information of the communication apparatus 100-1 is currently stopped, the communication apparatus 100-1 starts regular transmission of the information (Step S308). Specifically, in the case where it is determined that the state of the communication apparatus 100-1 is the waiting state, the control unit 106 makes a transition of the state of the communication apparatus 100-1 to the information transmission state. Then, the communication unit 102 starts transmission of the information containing the identification information of the communication apparatus 100-1.

In the case where it is determined that the position indicated by the acquired position information does not fall within the predetermined geographical range in Step S304, the communication apparatus 100-1 determines whether or not the information containing the identification information of the communication apparatus 100-1 is regularly transmitted (Step S310). Specifically, in the case where it is not determined that the position indicated by the acquired position information falls within the area indicated by the geographical information stored in the storage unit 108, the control unit 106 determines whether or not the state of the communication apparatus 100-1 is the information transmission state.

In the case where it is determined that the information containing the identification information of the communication apparatus 100-1 is regularly transmitted, the communication apparatus 100-1 stops transmission of the information (Step S312). Specifically, in the case where it is determined that the state of the communication apparatus 100-1 is the information transmission state, the control unit 106 makes a transition of the state of the communication apparatus 100-1 to the waiting state. Then, the communication unit 102 stops transmission of the information containing the identification information of the communication apparatus 100-1.

Note that, in the case where it is determined that transmission of the information containing the identification information of the communication apparatus 100-1 is not currently stopped in Step S306 and in the case where it is determined that the information containing the identification information of the communication apparatus 100-1 is not regularly transmitted in Step S310, the processing is terminated.

As described above, according to the first embodiment of the present disclosure, the communication apparatus 100-1 acquires the information on the position of the communication apparatus 100-1 and, in the case where the acquired information satisfies the predetermined condition, controls transmission of the information containing the identification information of the communication apparatus 100-1. Thus, the information containing the identification information can be transmitted in the case where the communication apparatus 100-1 positions at a place at which security of communication is high as compared with other places, and therefore it is possible to achieve both security and convenience of communication.

The identification information of the communication apparatus 100-1 is information that is stored in the storage unit 108 and is unique between communication apparatuses. Thus, information capable of specifying the communication apparatus 100-1 can be transmitted in the case where security of communication is comparatively high, and therefore it is possible to prevent the communication apparatus 100-1 from being traced and to protect privacy of the user.

The above predetermined condition includes a condition in which the position of the communication apparatus 100-1 acquired by the position information acquisition unit 104 falls within the predetermined geographical range. Because of this, a place at which the information containing the identification information is transmitted is specified, and therefore it is possible to transmit the information at a place at which the user intends. Thus, it is possible to improve convenience.

In the case where the information acquired by the position information acquisition unit 104 does not satisfy the above predetermined condition, the control unit 106 stops transmission of the information containing the identification information of the communication apparatus 100-1. Therefore, it is possible to further reduce a possibility that the position of the communication apparatus 100-1 is known by another person and to further reinforce protection of privacy of the user who uses the communication apparatus 100-1.

Note that, hereinabove, there has been described an example where the identification information of the communication apparatus 100-1 is, as first information, information that is stored in the storage unit 108 and is unique between communication apparatuses. However, the identification information may be another information. For example, the identification information does not necessarily need to be unique information and may be information generated by the control unit 106 at random as described below or may be information acquired from the outside. The identification information may also be a device name or the like indicating the communication apparatus 100-1.

[2-3. Modification Examples]

Hereinabove, the first embodiment of the present disclosure has been described. Note that the present embodiment is not limited to the above example. Hereinafter, first to fourth modification examples of the present embodiment will be described.

First Modification Example

As the first modification example of the present embodiment, the communication apparatus 100-1 may acquire external environment information of the communication apparatus 100-1 and, in the case where the acquired external environment information satisfies a predetermined condition, may control transmission of the information containing the identification information of the communication apparatus 100-1.

Figure 4:
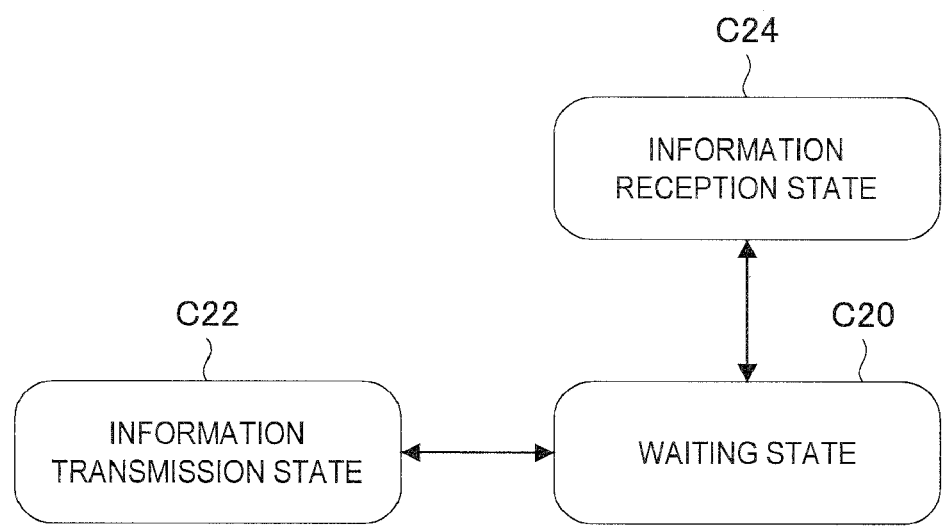
FIG. 4 shows an example of state transition of a communication apparatus according to a first modification example of the present embodiment.

Specifically, the communication unit 102 acquires information on another communication apparatus existing in a communicable range, and, in the case where the acquired information on the other communication apparatus satisfies the predetermined condition, the control unit 106 controls transmission of the information containing the identification information of the communication apparatus 100-1. Processing of the communication unit 102 and the control unit 106 in the present modification example will be described with reference to FIG. 4. FIG. 4 shows an example of state transition of the communication apparatus 100-1 according to the present modification example.

The communication unit 102 acquires information on another communication apparatus in accordance with the state of the communication apparatus 100-1. For example, as shown in FIG. 4, the state of the communication apparatus 100-1 can be a waiting state C20, an information transmission state C22, or an information reception state C24. In the case where the state of the communication apparatus 100-1 is the information reception state C24, the communication unit 102 receives information containing identification information of another communication apparatus, the information being transmitted from the other communication apparatus. For example, in the case where the state of the communication apparatus 100-1 is a scanning state, the communication unit 102 receives an advertising packet transmitted from another communication apparatus.

Figure 5:
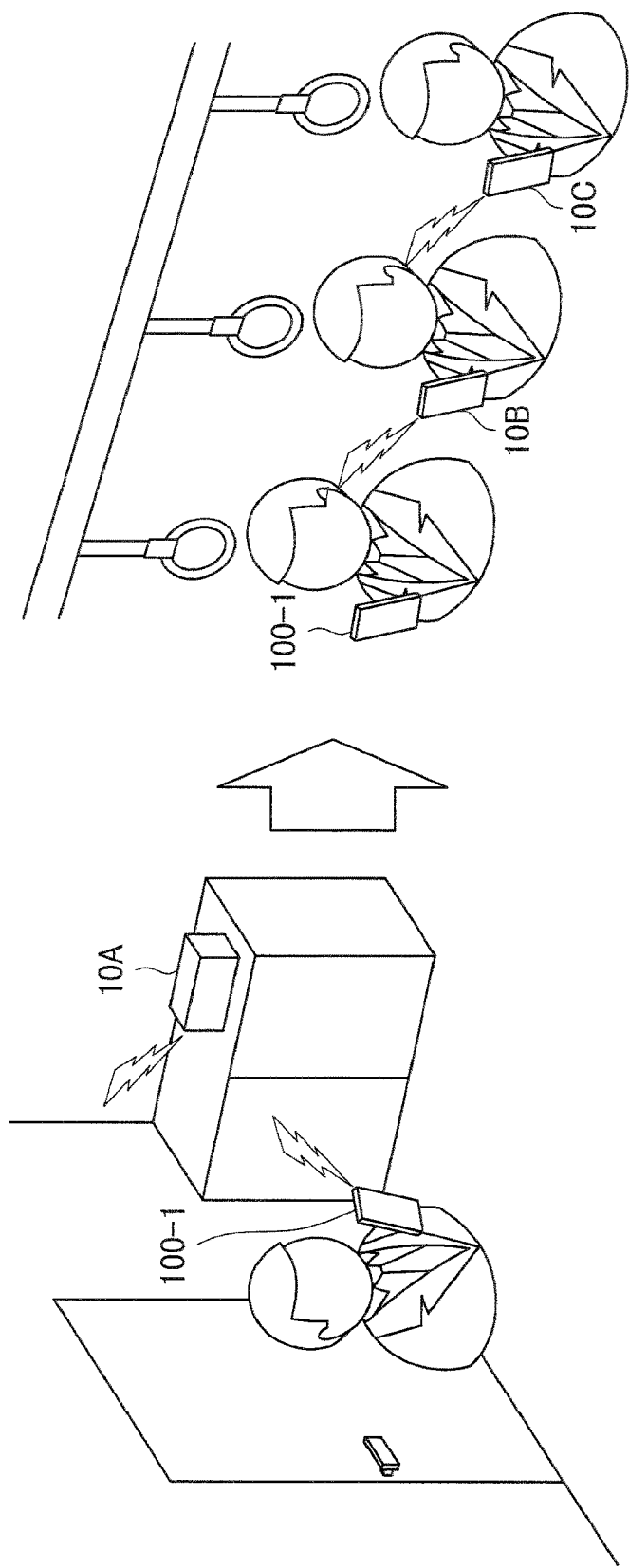
FIG. 5 is a diagram for describing an operation example of the communication apparatus according to the first modification example of the present embodiment.

The control unit 106 regularly makes a transition of the state of the communication apparatus 100-1 to the information reception state C24. For example, the control unit 106 can make a transition of the state of the communication apparatus 100-1 to the scanning state at predetermined time intervals. Further, the control unit 106 makes a transition of the state of the communication apparatus 100-1 to the information reception state C24 and, after a predetermined time passes, makes a transition of the state of the communication apparatus 100-1 to the waiting state C20 and then to the information transmission state C22. For example, the predetermined time can be set to be longer than 1 sec. Operation of the communication apparatus 100-1 according to the present modification example will be described in detail with reference to FIG. 5. FIG. 5 is a diagram for describing an operation example of the communication apparatus 100-1 according to the present modification example.

Start of Transmission of Information Containing Identification Information

In the case where the control unit 106 makes a transition of the state of the communication apparatus 100-1 to the information reception state C24, the communication unit 102 starts reception of information containing identification information transmitted from another communication apparatus. For example, the communication unit 102 can receive information containing identification information transmitted from another communication apparatus 10A placed in a house shown in the left drawing of FIG. 5 while the communication apparatus 100-1 is in the information reception state C24.

Next, the control unit 106 determines whether or not the information on the other communication apparatus acquired by the communication unit 102 contains information on another predetermined communication apparatus. For example, in the case where the information on the other communication apparatus 10A is received by the communication unit 102, the control unit 106 acquires information on another predetermined communication apparatus, the information being stored in the storage unit 108, such as identification information of a specific communication apparatus (hereinafter, also referred to as "specific identification information"). Then, the control unit 106 determines whether or not the received information on the other communication apparatus 10A contains the acquired specific identification information.

In the case where it is determined that the acquired information on the other communication apparatus contains the information on the other predetermined communication apparatus, the control unit 106 starts transmission of the information containing the identification information of the communication apparatus 100-1. For example, in the case where it is determined that the information on the other communication apparatus 10A contains the specific identification information and the state of the communication apparatus 100-1 is the waiting state C20, the control unit 106 makes a transition of the state of the communication apparatus 100-1 to the information transmission state C22. As a result, the communication unit 102 starts transmission of the information containing the identification information of the communication apparatus 100-1.

Stop of Transmission of Information Containing Identification Information

In the case where it is determined that the information on the other communication apparatus does not contain the information on the other predetermined communication apparatus, the control unit 106 does not transmit the information containing the identification information of the communication apparatus 100-1.

For example, the communication unit 102 can receive information containing identification information transmitted from other communication apparatuses 10A and 10B inside a train shown in the left drawing of FIG. 5 while the communication apparatus 100-1 is in the information reception state C24.

Next, in the case where the information on the other communication apparatuses 10A and 10B is received by the communication unit 102, the control unit 106 determines whether or not the received information on the other communication apparatuses 10A and 10B contains the specific identification information stored in the storage unit 108.

Then, in the case where it is determined that the information on the other communication apparatuses 10A and 10B does not contain the specific identification information and the state of the communication apparatus 100-1 is the information transmission state C22, the control unit 106 makes a transition of the state of the communication apparatus 100-1 to the waiting state C20. As a result, the information containing the identification information of the communication apparatus 100-1 is not transmitted by the communication unit 102.

Note that, in the above example, there has been described an example where, in the case where the information received from the other communication apparatus does not contain the specific identification information, a transition of the state of the communication apparatus 100-1 is made to the waiting state C20. However, the control unit 106 may make a transition of the state of the communication apparatus 100-1 from the information transmission state C22 to the waiting state C20 after a predetermined time passes from a point of time at which information has been received from the other communication apparatus related to the specific identification information. In this case, it is possible to prevent transmission of the information containing the identification information of the communication apparatus 100-1 from being erroneously stopped when the communication apparatus 100-1 fails to receive the information transmitted from the other communication apparatus existing in a communicable range and related to the specific identification information.

Figure 6:
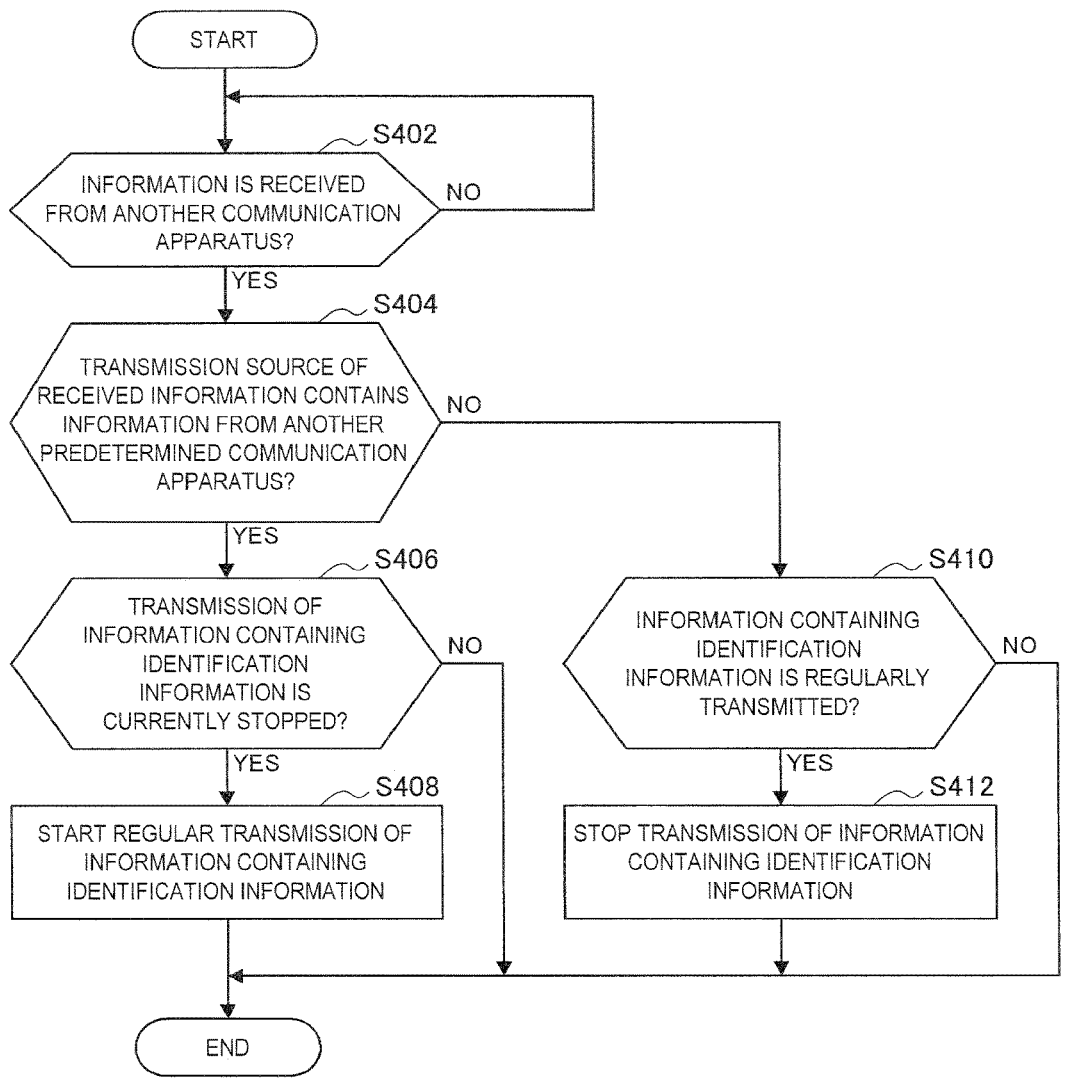
FIG. 6 is a flowchart conceptually showing processing of the communication apparatus in the first modification example of the present embodiment.

Processing of the communication apparatus 100-1 in the first modification example of the present embodiment will be described with reference to FIG. 6. FIG. 6 is a flowchart conceptually showing processing of the communication apparatus 100-1 in the present modification example. Note that detailed description of processing substantially the same as the processing in the first embodiment will be omitted.

First, the communication apparatus 100-1 waits until the communication apparatus 100-1 receives information from another communication apparatus (Step S402). Specifically, the control unit 106 makes a transition of the state of the communication apparatus 100-1 to the information reception state C24 at predetermined time intervals, and, in the case where the state of the communication apparatus 100-1 is the information reception state C24, the communication unit 102 receives information containing identification information of another communication apparatus from the other communication apparatus.

When the information is received from the other communication apparatus, the communication apparatus 100-1 determines whether or not a transmission source of the received information is another predetermined communication apparatus (Step S404). Specifically, in the case where information is received by the communication unit 102 from the other communication apparatus, the control unit 106 determines whether or not the received information on the other communication apparatus contains specific identification information stored in the storage unit 108.

In the case where it is determined that the transmission source of the received information is the other predetermined communication apparatus, the communication apparatus 100-1 determines whether or not transmission of the information containing the identification information of the communication apparatus 100-1 is currently stopped (Step S406). Specifically, in the case where it is determined that the information on the other communication apparatus contains the specific identification information, the control unit 106 determines whether or not the state of the communication apparatus 100-1 is the waiting state C20.

In the case where it is determined that transmission of the information containing the identification information of the communication apparatus 100-1 is currently stopped, the communication apparatus 100-1 starts regular transmission of the information (Step S408). Specifically, processing is substantially the same as the processing in Step S308 in the first embodiment shown in FIG. 3, and therefore description will be omitted.

In the case where it is not determined that the transmission source of the received information is the other predetermined communication apparatus in Step S404, the communication apparatus 100-1 determines whether or not the information containing the identification information of the communication apparatus 100-1 is regularly transmitted (Step S410). Specifically, in the case where it is not determined that the information on the other communication apparatus contains the specific identification information, the control unit 106 determines whether or not the state of the communication apparatus 100-1 is the information transmission state C22.

In the case where it is determined that the information containing the identification information of the communication apparatus 100-1 is regularly transmitted, the communication apparatus 100-1 stops transmission of the information (Step S412). Specifically, processing is substantially the same as the processing in Step S312 in the first embodiment shown in FIG. 3, and therefore description will be omitted.

As described above, according to the first modification example of the present embodiment, the communication apparatus 100-1 acquires external environment information of the communication apparatus 100-1 and, in the case where the acquired external environment information satisfies the predetermined condition, controls transmission of the information containing the identification information of the communication apparatus 100-1. Thus, the information containing the identification information of the communication apparatus 100-1 is transmitted in accordance with a status on the periphery of the communication apparatus 100-1, and therefore it is possible to increase an opportunity to transmit the information while maintaining security of communication.

The external environment information contains information on another communication apparatus existing in a range in which the communication apparatus 100-1 is communicable. Thus, information is transmitted in accordance with a status of the other communication apparatus that receives information transmitted by the communication apparatus 100-1, and therefore it is possible to improve accuracy of determination on whether or not the status is suitable for transmission of information and to improve security of communication.

The predetermined condition includes a condition in which information on another communication apparatus acquired by the communication unit 102 contains information on another predetermined communication apparatus. Thus, transmission of information is controlled by using the other predetermined communication apparatus as a mark, and therefore it is possible to further improve accuracy of determination on whether or not the status is suitable for transmission of information and to further improve security of communication.

Note that, hereinabove, there has been described an example where the control unit 106 performs state transition control depending on whether or not information on another communication apparatus contains information on another predetermined communication apparatus. However, the control unit 106 may perform state transition control depending on the number of pieces of information on another communication apparatus contained in information of another communication apparatus. For example, the control unit 106 counts the number of pieces of the information from the other communication apparatus received within a predetermined period of time. Then, in the case where the state of the communication apparatus 100-1 is the information transmission state C22 when the number of counted pieces of the information is equal to or larger than a threshold, the control unit 106 makes a transition of the state of the communication apparatus 100-1 to the waiting state C20. In this case, even in the case where another communication apparatus related to the specific identification information does not exist on the periphery of the communication apparatus 100-1, it is possible to transmit information in accordance with a peripheral status of the communication apparatus 100-1, and it is possible to increase an opportunity to transmit information.

The communication apparatus 100-1 additionally includes a sensor, and, in the case where an external environment of the communication apparatus 100-1 detected by the sensor is in a predetermined state, transmission of the information containing the identification information of the communication apparatus 100-1 may be controlled.

Specifically, the sensor detects the external environment of the communication apparatus 100-1 and generates external environment information indicating the detected external environment. Then, the control unit 106 determines whether or not the external environment indicated by the external environment information generated by the sensor is in the predetermined state and, in the case where it is determined that the external environment is in the predetermined state, controls transmission of the information containing the identification information of the communication apparatus 100-1. For example, the sensor can be a voice sensor, an optical sensor, a temperature sensor, a humidity sensor, a barometric sensor, or a biosensor.

For example, in the case where the sensor is a voice sensor, the voice sensor collects voice on the periphery of the communication apparatus 100-1 and generates voice information containing information on a sound volume of the collected voice. Then, the control unit 106 determines whether or not the sound volume indicated by the voice information generated by the voice sensor is equal to or larger than a threshold. In the case where it is determined that the sound volume is equal to or larger than the threshold, the control unit 106 controls state transition of the communication apparatus 100-1, for example, performs control to make a transition of the state of the communication apparatus 100-1 from the information transmission state C22 to the waiting state C20.

As described above, in the case where the external environment of the communication apparatus 100-1 detected by the sensor is in the predetermined state, the communication apparatus 100-1 controls transmission of the information containing the identification information of the communication apparatus 100-1. Therefore, even in the case where information from another communication apparatus is not received, it is possible to know the peripheral status of the communication apparatus 100-1 and to perform transmission of the information containing the identification information in a suitable status. Note that a plurality of sensors may be combined.

Second Modification Example

As the second modification example of the present embodiment, the communication apparatus 100-1 may control transmission of the information containing the identification information of the communication apparatus 100-1 on the basis of information on time. Specifically, the control unit 106 acquires the information on time and, in the case where the acquired information on time satisfies a predetermined condition, controls transmission of the information containing the identification information of the communication apparatus 100-1.

For example, the control unit 106 regularly acquires a current time from a real-time clock or the like that is additionally included in the communication apparatus 100-1 and determines whether or not the acquired time is a predetermined time. In the case where it is determined that the acquired time is the predetermined time, the control unit 106 controls state transition of the communication apparatus 100-1. Then, the communication unit 102 starts or stops transmission of the information containing the identification information of the communication apparatus 100-1 in accordance with the state of the communication apparatus 100-1. Note that the control unit 106 may control state transition in the case where the acquired time is within a predetermined period of time, for example, in the morning/afternoon or between 10 o'clock to 14 o'clock. Further, the control unit 106 may acquire information containing date and time or day and control state transition in the case where the acquired information indicates a predetermined date or day.

The control unit 106 may control state transition of the communication apparatus 100-1 in accordance with a passage of time from a point of time at which a predetermined event has occurred. For example, the control unit 106 stores time at which transition of the state of the communication apparatus 100-1 has been made to the waiting state C20, regularly acquires a current time from the real-time clock, and determines whether or not a predetermined time has passed from the stored time. In the case where it is determined that the predetermined time has passed from the time, transition of the state of the communication apparatus 100-1 is made to the information transmission state C22. In this case, time at which state transition is controlled is changed in accordance with occurrence of the event, and therefore it is possible to perform information transmission control suitable for behavior and the like of a user, and it is possible to improve convenience for the user.

As described above, according to the second modification example of the present embodiment, the communication apparatus 100-1 controls transmission of the information containing the identification information of the communication apparatus 100-1 on the basis of the information on time. Therefore, in the case where the position, the external environment, or the like of the communication apparatus 100-1 is changed in accordance with time, it is possible to easily perform transmission of the information containing the identification information, which is suitable for a status at the time.

Third Modification Example

As the third modification example of the present embodiment, the communication apparatus 100-1 may control transmission of the information containing the identification information of the communication apparatus 100-1 on the basis of operation on the communication apparatus 100-1. Specifically, the communication apparatus 100-1 additionally includes an operation detection unit, and the operation detection unit detects operation on the communication apparatus 100-1 and notifies the control unit 106 of information on the detected operation.

Then, in the case where the information on the operation of which the control unit is notified satisfies a predetermined condition, the control unit 106 controls transmission of the information containing the identification information of the communication apparatus 100-1.

For example, in the case where button pushing operation is performed by a user, the operation detection unit detects the button pushing operation and notifies the control unit 106 of information on the operation. The control unit 106 that has received such notification determines whether or not operation indicated by the information on the operation is predetermined operation. In the case where it is determined that the operation is the predetermined operation, the control unit 106 makes a transition of the state of the communication apparatus 100-1 to the information transmission state C22. As a result, the communication unit 102 starts transmission of the information containing the identification information of the communication apparatus 100-1. Note that information on the predetermined operation can be stored in advance in the storage unit 108 or the like.

As described above, according to the third modification example of the present embodiment, the communication apparatus 100-1 controls transmission of the information containing the identification information of the communication apparatus 100-1 on the basis of operation on the communication apparatus 100-1. Thus, transmission of the information containing the identification information of the communication apparatus 100-1 is controlled in accordance with intension of the user, and therefore it is possible to improve convenience for the user.

Fourth Modification Example

As the fourth modification example of the present embodiment, the communication apparatus 100-1 may control transmission of information containing information generated at random (hereinafter, also referred to as "random information") as second identification information of the communication apparatus 100-1, instead of stopping transmission of the information containing the identification information of the communication apparatus 100-1. Specifically, in the case where acquired position information or external environment information does not satisfy a predetermined condition, the control unit 106 controls transmission of the information containing the identification information of the communication apparatus 100-1 generated at random.

For example, in the case where it is determined that a position indicated by position information acquired by the position information acquisition unit 104 does not fall within a predetermined geographical range, the control unit 106 starts information containing the random information as the identification information of the communication apparatus 100-1. For example, the random information can be configured by a hash value and a random value. The random value is a value changed for each predetermined time, and the hash value is a value calculated by using a hash function with the use of a value of an identity resolving key (IRK) held by the communication apparatus 100-1 and the random value. In the case where, for example, the communication apparatus 100-1 is started, the control unit 106 generates random information. Note that another communication apparatus that receives the information containing the random information calculates a hash value with the use of the IRK acquired from the communication apparatus 100-1 in advance and the random value configuring the received random information and, in the case where the calculated hash value and the hash value configuring the random information are matched with each other, the other communication apparatus determines that the information containing the random information is information transmitted from the communication apparatus 100-1.

Note that, as the state of the communication apparatus 100-1, a state in which the communication unit 102 transmits the information containing the random information as the identification information of the communication apparatus 100-1 may be added. For example, in the case where the acquired position information or the like does not satisfy the predetermined condition, the control unit 106 makes a transition of the state of the communication apparatus 100-1 to the added state.

Then, the communication unit 102 starts transmission of the information containing the random information. In this case, transmission of the information containing the random information is controlled by state transition control, and therefore it is possible to prevent communication control of the communication apparatus 100-1 from being complicated and to reduce a possibility that malfunction occurs.

As described above, according to the fourth modification example of the present embodiment, in the case where the acquired position information or external environment information does not satisfy the predetermined condition, the communication apparatus 100-1 controls transmission of the information containing the identification information of the communication apparatus 100-1 generated at random. Thus, information containing, as identification information, random information capable of being recognized by only another specific communication apparatus as the identification information is continuously transmitted, and therefore it is possible to increase an opportunity to transmit information while maintaining security of communication.

3. Second Embodiment (Example of Operation in State of Connection with Another Communication Apparatus)

Hereinabove, the communication apparatus 100-1 according to the first embodiment of the present disclosure has been described. Next, the communication apparatus 100-2 according to the second embodiment of the present disclosure will be described. The communication apparatus 100-2 according to the present embodiment controls transmission of information containing identification information of the communication apparatus 100-2 on the basis of communication connection with a communication apparatus 200.

3-1. Configurations of Communication Apparatuses

Figure 7:
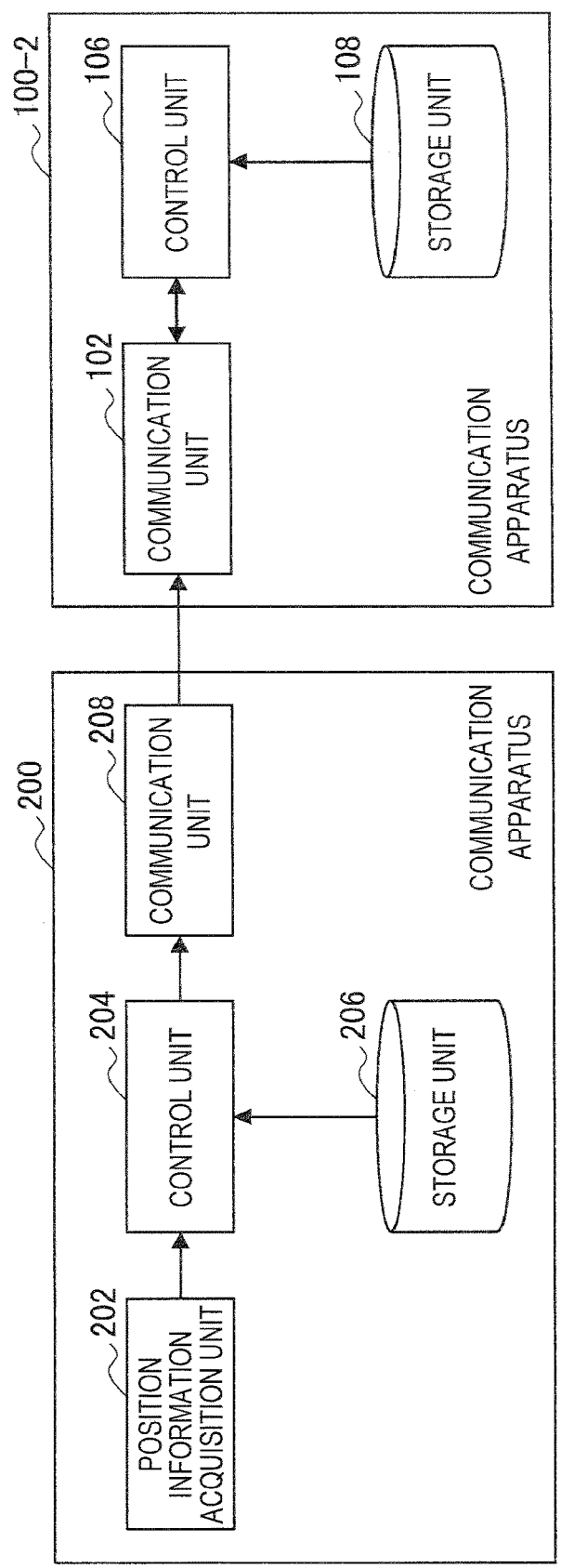
FIG. 7 is a block diagram showing schematic functional configurations of a communication apparatus according to a second embodiment of the present disclosure and a communication apparatus.

Configurations of the communication apparatus 100-2 according to the second embodiment of the present disclosure and the communication apparatus 200 will be described with reference to FIG. 7. FIG. 7 is a block diagram showing schematic functional configurations of the communication apparatus 100-2 according to the second embodiment of the present disclosure and the communication apparatus 200.

(Configuration of Communication Apparatus 200)

As shown in FIG. 7, the communication apparatus 200 includes a position information acquisition unit 202, a control unit 204, a storage unit 206, and a communication unit 208.

The position information acquisition unit 202 acquires position information of the communication apparatus 200. Specifically, the position information acquisition unit 202 is substantially the same as the position information acquisition unit 104 of the communication apparatus 100-1 according to the first embodiment, and therefore description thereof will be omitted.

The control unit 204 controls communication of the communication apparatus 200. Specifically, in the case where the position information acquired by the position information acquisition unit 202 satisfies a predetermined condition, the control unit 204 controls transmission of information of the communication apparatus 100-2 by causing the communication unit 208 to communicate with the communication apparatus 100-2. Hereinafter, processing of the control unit 204 will be described in detail.

Instruction to Start Transmission of Information Containing Identification Information of Communication Apparatus 100-2

The control unit 204 causes the communication unit 208 to establish communication connection with the communication apparatus 100-2. For example, in the case where information containing identification information transmitted by the communication apparatus 100-2 is received by the communication unit 208, the control unit 204 instructs the communication unit 208 to perform communication connection, and the communication unit 208 that has received such instruction transmits a connection request to the communication apparatus 100-2. In the case where a connection response is received from the communication apparatus 100-2, communication connection with the communication apparatus 100-2 is established.

Next, in the case where position information is acquired by the position information acquisition unit 202, the control unit 204 determines whether or not the acquired position information satisfies the predetermined condition. The processing is substantially the same as the processing of the communication apparatus 100-1 according to the first embodiment, and therefore description thereof will be omitted.

In the case where the acquired position information satisfies the predetermined condition, the control unit 204 causes the communication unit 208 to transmit a transmission start instruction to the communication apparatus 100-2. For example, the control unit 204 generates a transmission start instruction to instruct transmission of the information containing the identification information of the communication apparatus 100-2 and instructs the communication unit 208 to transmit the generated transmission start instruction. The communication unit 208 that has received such instruction transmits the generated transmission start instruction to the communication apparatus 100-2. As a result, the communication apparatus 100-2 that has received the transmission start instruction starts transmission of the information containing the identification information of the communication apparatus 100-2.

Instruction to Stop Transmission of Information Containing Identification Information of Communication Apparatus 100-2

In the case where the acquired position information does not satisfy the predetermined condition, the control unit 204 causes the communication unit 208 to transmit a transmission stop instruction to the communication apparatus 100-2. For example, the control unit 204 generates a transmission stop instruction to instruct transmission of the information containing the identification information of the communication apparatus 100-2 and instructs the communication unit 208 to transmit the generated transmission stop instruction. The communication unit 208 that has received such instruction transmits the generated transmission stop instruction to the communication apparatus 100-2. As a result, the communication apparatus 100-2 that has received the transmission stop instruction stops transmission of the information containing the identification information of the communication apparatus 100-2.

Note that the control unit 204 may cause the communication unit 208 to cut communication connection with the communication apparatus 100-2. Further, the control unit 204 may store content of the instruction that the communication unit 208 is instructed to transmit and, in the case where content of a generated instruction is the same as the content of the stored instruction, the control unit 204 may not generate the instruction.

The storage unit 206 stores geographical information and the like for use in processing of the control unit 204. Specifically, the storage unit 206 is substantially the same as the storage unit 108 in the communication apparatus 100-2 according to the first embodiment, and therefore description thereof will be omitted.

The communication unit 208 communicates with the communication apparatus 100-2. Specifically, the communication unit 208 establishes communication connection with the communication apparatus 100-2 and transmits information such as a transmission start instruction generated by the control unit 204 to the communication apparatus 100-2.

(Configuration of Communication Apparatus 100-2)

As shown in FIG. 7, the communication apparatus 100-2 includes a communication unit 102, a control unit 106, and a storage unit 108.

Figure 8:
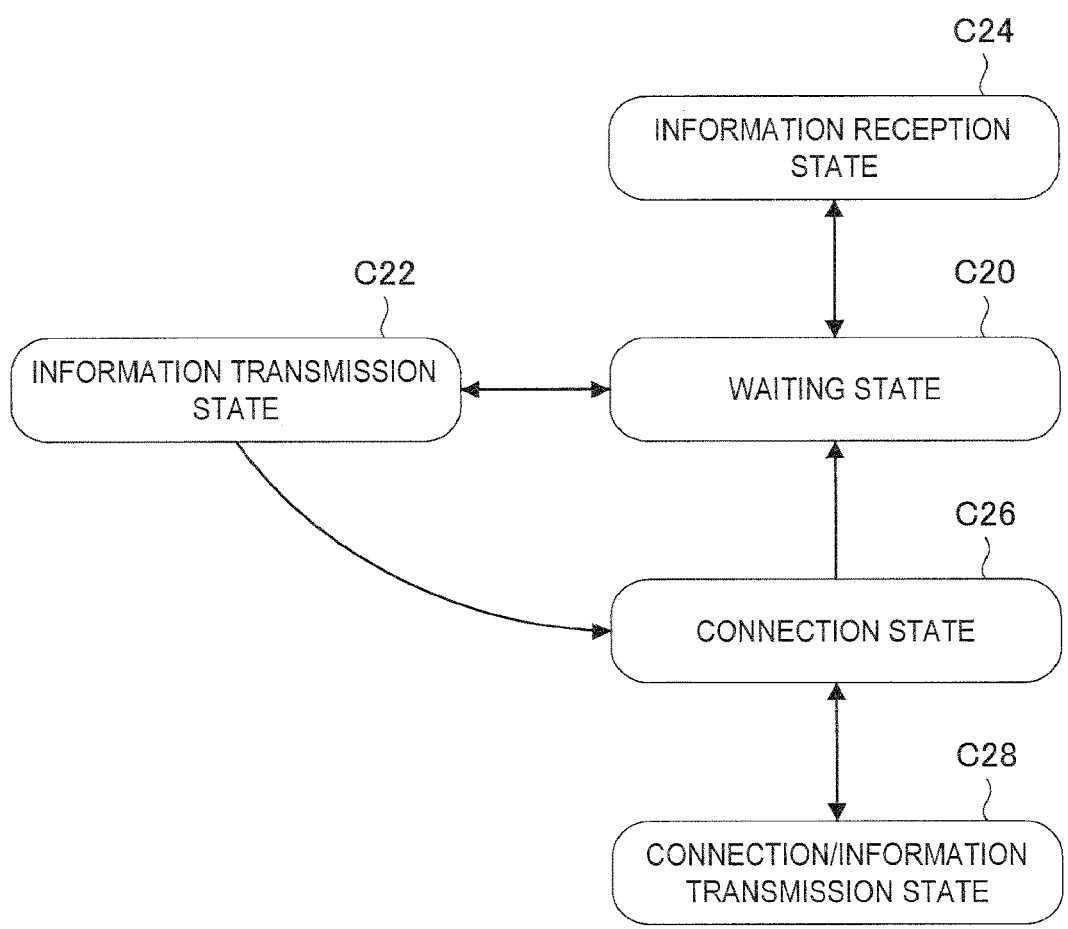
FIG. 8 shows an example of state transition of the communication apparatus according to the present embodiment.

The communication unit 102 communicates with the communication apparatus 200. Specifically, the communication unit 102 establishes communication connection with the communication apparatus 200 and receives information such as a transmission start instruction transmitted from the communication apparatus 200. Further, the communication unit 102 transmits the information containing the identification information of the communication apparatus 100-2 in accordance with a state of the communication apparatus 100-2. Operation of the communication unit 102 will be described with reference to FIG. 8. FIG. 8 shows an example of state transition of the communication apparatus 100-2 according to the present embodiment.

As shown in FIG. 8, the state of the communication apparatus 100-2 can be a waiting state C20, an information transmission state C22, an information reception state C24, a connection state C26, or a connection/information transmission state C28.

In the case where the state of the communication apparatus 100-2 is the connection state C26, the communication unit 102 receives information such as an instruction from the communication apparatus 200 without transmitting the information containing the identification information of the communication apparatus 100-2. Further, in the case where the state of the communication apparatus 100-2 is the connection/information transmission state C28, the communication unit 102 receives information such as an instruction from the communication apparatus 200 while regularly transmitting the information containing the identification information of the communication apparatus 100-2.

The control unit 106 controls transmission of the information containing the identification information on the basis of a control signal from the communication apparatus 200 while being connected to the communication apparatus 200. Specifically, the control unit 106 performs state transition control of the communication apparatus 100-2 on the basis of a transmission start instruction or the like transmitted from the communication apparatus 200.

For example, in the case where the communication unit 102 establishes connection with the communication apparatus 200, the control unit 106 makes a transition of the state of the communication apparatus 100-2 from the information transmission state C22 to the connection state C26. Further, in the case where a transmission start instruction is received by the communication unit 102, the control unit 106 makes a transition of the state of the communication apparatus 100-2 from the connection state C26 to the connection/information transmission state C28. Further, in the case where a transmission stop instruction is received by the communication unit 102, the control unit 106 makes a transition of the state of the communication apparatus 100-2 from the connection/information transmission state C28 to the connection state C26. Note that, in the case where communication connection with the communication apparatus 200 is cut, the control unit 106 makes a transition of the state of the communication apparatus 100-2 from the connection state C26 to the waiting state C20 or makes a transition thereof from the connection/information transmission state C28 to the connection state C26 and then to the waiting state C20. Note that, in the case where connection with the communication apparatus 200 is not established, the control unit 106 makes a transition of the state of the communication apparatus 100-2 to the information transmission state C22.

3-2. Processing of Communication Apparatus

Figure 9:
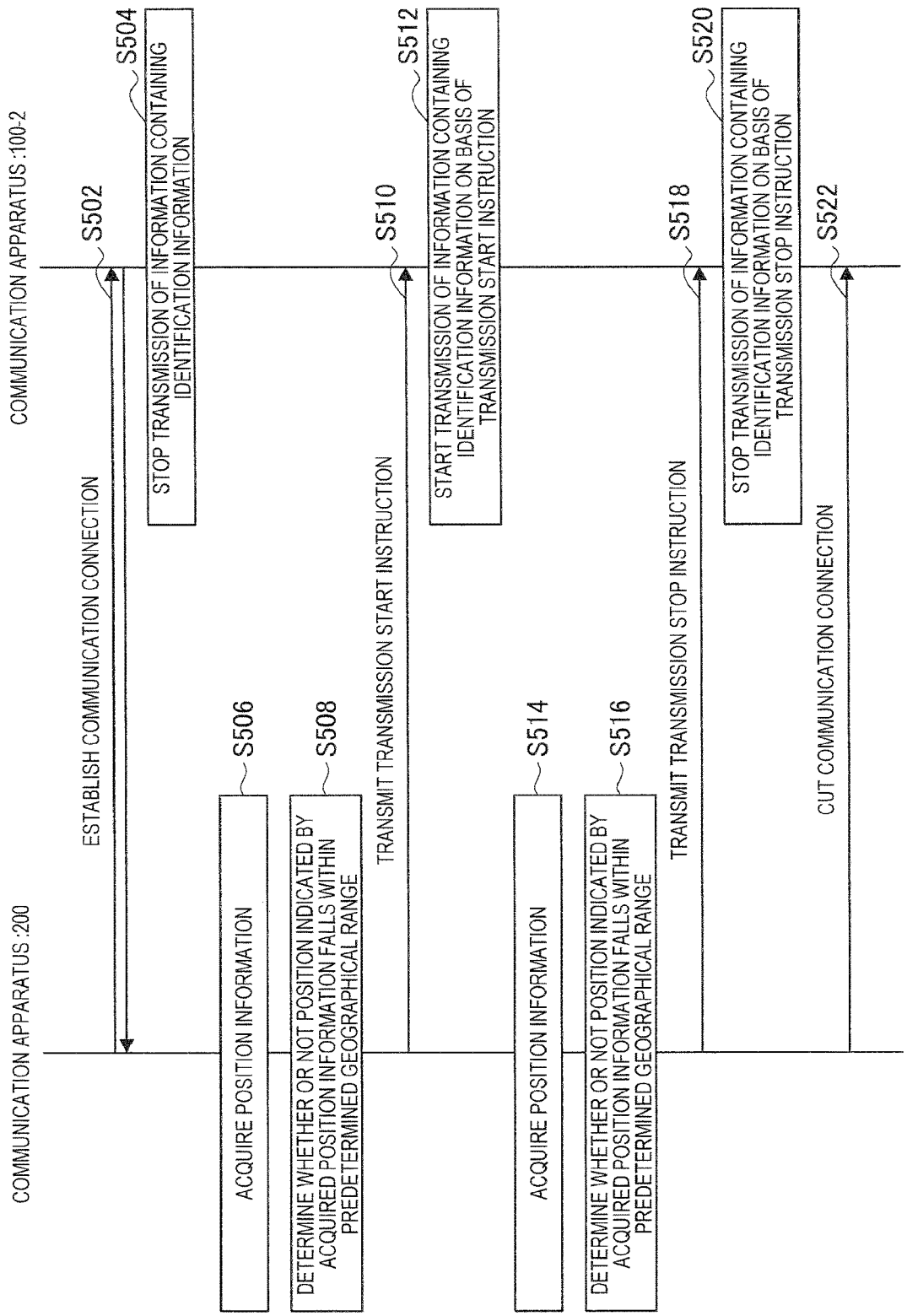
FIG. 9 is a flowchart conceptually showing processing of the communication apparatus in the present embodiment.

Next, processing of the communication apparatus 100-2 in the present embodiment will be described with reference to FIG. 9. FIG. 9 is a flowchart conceptually showing processing of the communication apparatus 100-2 in the present embodiment.

First, the communication apparatus 200 and the communication apparatus 100-2 establish communication connection (Step S502). Specifically, in the case where information containing identification information transmitted from the communication apparatus 100-2 is received by the communication unit 208, the control unit 204 causes the communication unit 208 to transmit a connection request to the communication apparatus 100-2. Then, in the case where the connection request is received by the communication unit 102 and communication connection is possible, the control unit 106 causes the communication unit 102 to transmit a connection response to the communication apparatus 200.

In the case where communication connection with the communication apparatus 200 is established, the communication apparatus 100-2 stops transmission of the information containing the identification information (Step S504). Specifically, in the case where the communication unit 102 establishes communication connection with the communication apparatus 200, the control unit 106 makes a transition of the state of the communication apparatus 100-2 from the information transmission state C22 to the connection state C26. As a result, the communication unit 102 stops transmission of the information containing the identification information.

Next, the communication apparatus 200 acquires position information (Step S506) and determines whether or not a position indicated by the acquired position information falls within a predetermined geographical range (Step S508). Specifically, the processing is substantially the same as the processing in Step S302 and S304 of the first embodiment shown in FIG. 3, and therefore description thereof will be omitted.

In the case where it is determined that the position indicated by the acquired position information falls within the predetermined geographical range, the communication apparatus 200 transmits a transmission start instruction to the communication apparatus 100-2 (Step S510). Specifically, in the case where it is determined that the position indicated by the position information acquired by the position information acquisition unit 202 falls within the predetermined geographical range, the control unit 204 generates a transmission start instruction and causes the communication unit 208 to transmit the generated instruction to the communication apparatus 100-2.

The communication apparatus 100-2 that has received the transmission start instruction starts transmission of the information containing the identification information on the basis of the instruction (Step S512). Specifically, in the case where the transmission start instruction is received by the communication unit 102 from the communication apparatus 200, the control unit 106 makes a transition of the state of the communication apparatus 100-2 from the connection state C26 to the connection/information transmission state C28. As a result, the communication unit 102 starts transmission of the information containing the identification information.

After a predetermined time passes, the communication apparatus 200 acquires position information (Step S514) and determines whether or not a position indicated by the acquired position information falls within the predetermined geographical range (Step S516). The processing is similar to the processing in Step S506 and S508, and therefore description thereof will be omitted.

In the case where it is determined that the position indicated by the position information does not fall within the predetermined geographical range, the communication apparatus 200 transmits a transmission stop instruction to the communication apparatus 100-2 (Step S518). Specifically, in the case where it is determined that the position indicated by the position information acquired by the position information acquisition unit 202 does not fall within the predetermined geographical range, the control unit 204 generates a transmission stop instruction and causes the communication unit 208 to transmit the generated instruction to the communication apparatus 100-2.

The communication apparatus 100-2 that has received the transmission stop instruction stops transmission of the information containing the identification information on the basis of the instruction (Step S520). Specifically, in the case where the transmission stop instruction is received by the communication unit 102 from the communication apparatus 200, the control unit 106 makes a transition of the state of the communication apparatus 100-2 from the connection/information transmission state C28 to the connection state C26. As a result, the communication unit 102 stops transmission of the information containing the identification information.

Next, the communication apparatus 200 cuts communication connection (Step S522). Specifically, the control unit 204 instructs the communication unit 208 to cut communication connection with the communication apparatus 100-2, and the communication unit 208 cuts the communication connection. In response to this, in the case where communication connection is cut, the control unit 106 makes a transition of the state of the communication apparatus 100-2 from the connection state C26 to the waiting state C20 and then to the information transmission state C22.

As described above, according to the second embodiment of the present disclosure, the communication apparatus 100-2 communicates with the communication apparatus 200 and controls transmission of the information containing the identification information of the communication apparatus 100-2 on the basis of communication with the communication apparatus 200. The communication apparatus 200 acquires information on a position or external environment of the communication apparatus 200 and performs predetermined communication with the communication apparatus in the case where the acquired information satisfies the predetermined condition. Therefore, even in the case where it is difficult for the communication apparatus 100-2 to have a configuration for acquiring position information or the like, it is possible to control transmission of information, and it is possible to simplify a function of the communication apparatus 100-2 and reduce a cost thereof.

The control unit 106 controls transmission of the information containing the identification information on the basis of a control signal from the communication apparatus 200 while being connected to the communication apparatus 200. Therefore, information containing identification information can be transmitted while the control unit is being connected to the communication apparatus 200, and therefore it is unnecessary to cut connection with the communication apparatus 200 in order to transmit information, and it is possible to improve convenience for a user.

3-3. Modification Example

Hereinabove, the second embodiment of the present disclosure has been described. Note that the present embodiment is not limited to the above example. Hereinafter, a modification example of the present embodiment will be described.

As a modification example of the present embodiment, the communication apparatus 100-2 may control transmission of the information containing the identification information in accordance with presence/absence of communication connection with the communication apparatus 200. Specifically, in the case where communication connection with the communication apparatus 200 is established, the control unit 106 makes a transition of the state of the communication apparatus 100-2 from the information transmission state C22 to the connection state C26, and the communication unit 102 stops transmission of the information containing the identification information. Meanwhile, in the case where communication connection with the communication apparatus 200 is cut, the control unit 106 makes a transition of the state of the communication apparatus 100-2 from the connection state C26 to the waiting state C20 and then to the information transmission state C22, and the communication unit 102 starts transmission of the information containing the identification information.

As described above, according to the modification example of the present embodiment, the communication apparatus 100-2 controls transmission of the information containing the identification information in accordance with presence/absence of communication connection with the communication apparatus 200. Thus, transmission of the information containing the identification information is controlled without newly adding a state such as the connection/information transmission state C28 as the state of the communication apparatus 100-2, and therefore it is possible to conform to the communication specification of BLE or the like and reduce a cost of the communication apparatus 100-2.

Note that, in the case where communication connection is cut and transition of the state of the communication apparatus 100-2 is made to the waiting state C20, the control unit 106 does not make a transition of the state of the communication apparatus 100-2 to the information transmission state C22 until an instruction by a user's explicit operation or the like is received or a predetermined condition is satisfied. Further, also in the case where the state of the communication apparatus 100-2 is the waiting state C20 as an initial state after the communication apparatus 100-2 is started, the control unit 106 controls state transition of the communication apparatus 100-2 in the same way as described above.

4. HARDWARE CONFIGURATION OF COMMUNICATION APPARATUS ACCORDING TO EMBODIMENT OF PRESENT DISCLOSURE

Hereinabove, the communication apparatus 100 according to each of the embodiments according to the present disclosure has been described. The processing of the communication apparatus 100 described above is realized by cooperation between software and hardware of the communication apparatus 100 described below.

Figure 10:
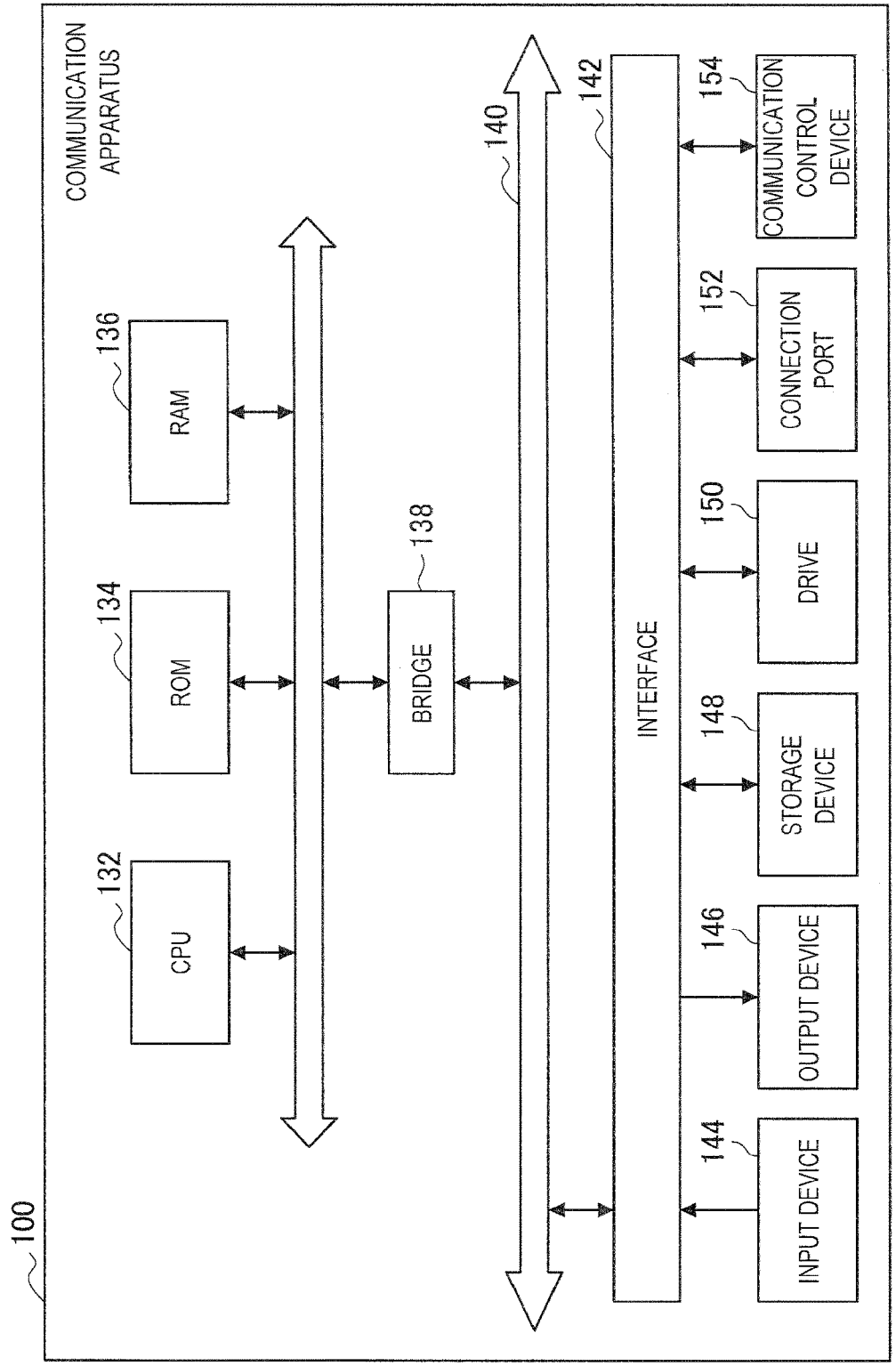
FIG. 10 is an explanatory view showing a hardware configuration of a communication apparatus according to the present disclosure.

FIG. 10 is an explanatory view showing a hardware configuration of the communication apparatus 100 according to the present disclosure. As shown in FIG. 10, the communication apparatus 100 includes a central processing unit (CPU) 132, a read only memory (ROM) 134, a random access memory (RANI) 136, a bridge 138, a bus 140, an interface 142, an input device 144, an output device 146, a storage device 148, a drive 150, a connection port 152, and a communication control device 154.

The CPU 132 functions as an arithmetic processing unit and a control device and cooperates with various programs to realize operation of the position information acquisition unit 104 and the control unit 106 in the communication apparatus 100. The CPU 132 may be a microprocessor. The ROM 134 stores programs, operation parameters, or the like to be used by the CPU 132. The RAM 136 temporarily stores programs for use in execution of the CPU 132, parameters that change as appropriate in the execution, and the like. A part of the storage unit 108 in the communication apparatus 100 is realized by the ROM 134 and the RAM 136. The CPU 132, the ROM 134, and the RAM 136 are connected to one another via an internal bus constituted of a CPU bus or the like.

The input device 144 includes, for example, input means for allowing a user to input information, such as a mouse, a keyboard, a touch panel, a button, a microphone, a switch, and a lever, and an input control circuit for generating an input signal on the basis of input by the user and outputting the signal to the CPU 132. The user of the communication apparatus 100 can operate the input device 144 to input various types of data to the communication apparatus 100 or instruct the communication apparatus 100 to perform processing operation.

The output device 146 performs output operation on a device, such as a liquid crystal display (LCD) device, an organic light emitting diode (OLED) device, or a lamp. Further, the output device 146 may include a loudspeaker and a headphone for outputting sound.

The storage device 148 is a device for storing data. The storage device 148 may include a storage medium, a recording device for recording data on the storage medium, a reading device for reading the data from the storage medium, a deleting device for deleting the data recorded on the storage medium, and the like. The storage device 148 stores programs executed by the CPU 132 and various types of data.

The drive 150 is a reader-writer for a storage medium and is provided inside or externally attached to the communication apparatus 100. The drive 150 reads information recorded on a removable storage medium that is attached thereto, such as a magnetic disk, an optical disk, a magneto-optical disk, or a semiconductor memory, and then outputs the information to the RAM 134. The drive 150 can also write information to the removable storage medium.

The connection port 152 is a bus to be connected to, for example, an information processing device or peripheral device provided outside the communication apparatus 100. The connection port 152 may be a universal serial bus (USB).

The communication control device 154 is, for example, as an example of the communication unit 102 of the communication apparatus 100, a communication interface constituted of a communication device to be connected to a network. The communication control device 154 may be an infrared communication compatible device, a wireless local area network (LAN) compatible communication device, a Long Term Evolution (LTE) compatible communication device, or a wired communication device for performing wired communication.

5. CONCLUSION

Hereinabove, according to the first embodiment of the present disclosure, information containing identification information can be transmitted in the case where the communication apparatus 100-1 positions at a place at which security of communication is high as compared with other places, and therefore it is possible to achieve both security and convenience of communication. Further, the information containing the identification information of the communication apparatus 100-1 is transmitted in accordance with a peripheral status of the communication apparatus 100-1, and therefore it is possible to maintain security of communication while having flexibility in transmitting information. In addition, according to the second embodiment of the present disclosure, even in the case where it is difficult for the communication apparatus 100-2 to have a configuration for acquiring position information or the like, it is possible to control transmission of information, and it is possible to simplify a function of the communication apparatus 100-2 and reduce a cost thereof.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In the above embodiment, for example, identification information is one piece of information in principle except the case where the identification information is random information. However, the present technique is not limited to such an example. For example, the communication apparatus 100 may have a plurality of pieces of identification information and switch the pieces of the identification information to be transmitted. Specifically, the control unit 106 selects identification information in accordance with a condition satisfied by acquired position information or external environment information and causes the communication unit 102 to transmit information containing the selected identification information. For example, in the case where a position indicated by position information acquired by the position information acquisition unit 104 is in a site of an office, the control unit 106 causes the communication unit 102 to transmit the information containing the identification information for the office. Meanwhile, in the case where the position indicated by the position information acquired by the position information acquisition unit 104 is a school, the control unit 106 causes the communication unit 102 to transmit the information containing the identification information for the school. In this case, identification information is properly used depending on the position or external environment of the communication apparatus 100, and therefore it is possible to prevent the communication apparatus from being traced and to further improve security of communication.

In the above embodiment, there has been described an example where position information acquired by the position information acquisition unit 104 and geographical information stored in the storage unit 108 are coordinate information. However, the position information and the geographical information may be information on facilities or the like. For example, the position information and the like can be names or types of commercial facilities or public facilities. For example, in the case where the position information is information indicating a specific station, for example, information indicating Tokyo station and the geographical information is information indicating an arbitrary station, the control unit 106 determines that a predetermined condition is satisfied. In this case, it is easy to set predetermined geographical information, and therefore it is possible to improve convenience for a user. In addition, the information is simpler than coordinate information, and therefore it is possible to simplify processing of the communication apparatus 100.

In the above embodiment, there has been described an example where the communication apparatus 100 controls transmission of the information containing the identification information on the basis of the position information or the external environment information. However, the communication apparatus 100 may perform the control by using both the position information and the external environment information. In this case, it is possible to control transmission of the information containing the identification information more finely, and therefore it is possible to satisfy various needs of a user.

In the above embodiment, there has been described an example where transmission of the information containing the identification information is controlled by controlling state transition of the communication apparatus 100. However, the control unit 106 may directly control transmission of the information containing the identification information of the communication unit 102. In this case, it is possible to be compliant with a communication specification in which state transition control is not performed.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

A communication apparatus, including:

an acquisition unit configured to acquire information on a position or external environment of the communication apparatus; and a control unit configured to control transmission of information containing first identification information of the communication apparatus in the case where the information acquired by the acquisition unit satisfies a predetermined condition.

(2)

The communication apparatus according to (1), wherein the first identification information is information that is stored in a storage unit of the communication apparatus and is unique between communication apparatuses.

(3)

The communication apparatus according to (2), wherein, in the case where the information acquired by the acquisition unit does not satisfy the predetermined condition, the control unit stops transmission of the information containing the first identification information or controls transmission of information containing second identification information of the communication apparatus generated at random.

(4)

The communication apparatus according to any one of (1) to (3), wherein the predetermined condition includes a condition in which the position of the communication apparatus acquired by the acquisition unit falls within a predetermined geographical range.

(5)

The communication apparatus according to any one of (1) to (4), wherein the information on the external environment contains information on another communication apparatus existing in a range in which the communication apparatus is communicable.

(6)

The communication apparatus according to (5), wherein the predetermined condition includes a condition in which the information on the other communication apparatus acquired by the acquisition unit contains information on a predetermined communication apparatus.

(7)

The communication apparatus according to any one of (1) to (6), wherein the information on the external environment includes information indicating the external environment of the communication apparatus detected by a sensor, and the predetermined condition includes a condition in which the external environment detected by the sensor is in a predetermined state.

(8)

The communication apparatus according to any one of (1) to (7), wherein transmission containing the first identification information is performed in accordance with a state of the communication apparatus, and in the case where the information acquired by the acquisition unit satisfies the predetermined condition, the control unit controls state transition of the communication apparatus.

(9)

A communication apparatus, including:

a communication unit configured to communicate with another communication apparatus; and a control unit configured to control transmission of information containing first identification information of the communication apparatus on the basis of communication with the other communication apparatus, wherein the other communication apparatus acquires information on a position or external environment of the other communication apparatus and performs predetermined communication with the communication apparatus in the case where the acquired information satisfies a predetermined condition.

(10)

The communication apparatus according to (9), wherein the control unit controls transmission of the information containing the first identification information on the basis of a control signal from the other communication apparatus while being connected to the other communication apparatus.

(11)

The communication apparatus according to (9), wherein the control unit controls transmission of the information containing the first identification information in accordance with presence/absence of communication connection with the other communication apparatus.

(12)

A communication method, including:
acquiring information on a position or external environment of a communication apparatus; and
controlling transmission of information containing first identification information of the communication apparatus in the case where the acquired information satisfies a predetermined condition.

(13)

A program for causing a computer to realize:
an acquisition function of acquiring information on a position or external environment of a communication apparatus; and
a control function of controlling transmission of information containing first identification information of the communication apparatus in the case where the information acquired by the acquisition function satisfies a predetermined condition.

REFERENCE SIGNS LIST 100 communication apparatus
102 communication unit
104 position information acquisition unit
106 control unit
108 storage unit
200 communication apparatus
202 position information acquisition unit
204 control unit
206 storage unit
208 communication unit

The invention claimed is:

1. A portable communication apparatus, comprising:
acquisition circuitry configured to acquire information regarding position data or an external environment of the portable communication apparatus; and
control circuitry configured to:
determine whether the information satisfies a predetermined condition that indicates a secure transmission environment;
determine whether the portable communication apparatus is in a state in which communication with another portable communication apparatus is not permitted;
in response to the control circuitry determining that both the information satisfies the predetermined condition and the portable communication apparatus is in the state in which communication is not permitted, change the state of the portable communication apparatus to a first state in which transmission, of first identification information of the portable communication apparatus, to the another portable communication apparatus is permitted; and
in response to the control circuitry determining that the information does not satisfy predetermined condition transmit second identification information of the portable communication apparatus to the another portable communication apparatus, wherein
the second identification information is generated according to a hash value and a random value,
the random value is changed for each predetermined time, and
the hash value is calculated according to an identity resolving key that is known by the another communication apparatus so that the second identification information is recognizable by the another communication apparatus.

2. The portable communication apparatus according to claim 1, wherein the first identification information is information that is stored in a storage unit of the portable communication apparatus and is unique between portable communication apparatuses.

3. The portable communication apparatus according to claim 2, wherein in a case where the information acquired by the acquisition circuitry does not satisfy the predetermined condition, the control circuitry stops transmission of the first identification information.

4. The portable communication apparatus according to claim 1, wherein the predetermined condition includes a condition in which the position data falls within a predetermined geographical range.

5. The portable communication apparatus according to claim 1, wherein the information on the external environment includes second information indicating that the another portable communication apparatus is in a range in which the portable communication apparatus is communicable.

6. The portable communication apparatus according to claim 5, wherein the predetermined condition includes a condition in which the second information includes third information on a predetermined portable communication apparatus.

7. The portable communication apparatus according to claim wherein
the information indicates that the external environment of the portable communication apparatus is detected by a sensor, and
the predetermined condition includes a condition in which the external environment detected by the sensor is in a predetermined state.

8. The portable communication apparatus according to claim 1, wherein the control circuitry transmits the second identification information continuously as the second identification information is changed according to the random value.

9. A portable communication apparatus, comprising:
communication circuitry configured to communicate with another portable communication apparatus; and
control circuitry configured to
control the communication circuitry to transmit first identification information of the portable communication apparatus in response to one or more communication control commands received from the another portable communication apparatus, wherein
the another portable communication apparatus acquires information position data or an external environment of the another portable communication apparatus,
the control circuitry controls the communication circuitry to perform predetermined communication with the another portable communication apparatus in response to the another portable communication apparatus determining that the information satisfies a predetermined condition that indicates a secure transmission environment, and the communication circuitry receives second identification information from the another portable communication apparatus in response to the another portable communication apparatus determining that the information does not satisfy the predetermined condition, the second identification information being generated according to a hash value and a random value, the random value being changed for each predetermined time, and the hash value being calculated according to an identity resolving key that is known by the portable communication apparatus so that the second identification information is recognizable by the portable communication apparatus.

10. The portable communication apparatus according to claim 9, wherein the control circuitry controls the communication circuitry to transmit the first identification information according to a control signal from the another portable communication apparatus while being connected to the another portable communication apparatus.

11. The portable communication apparatus according to claim 9, wherein the control circuitry controls the communication circuitry to transmit the first identification information in accordance with a presence/absence of a communication connection with the another portable communication apparatus.

12. A communication method, comprising:
    acquiring information regarding position data or an external environment of a portable communication apparatus;
    determining, by control circuitry of the portable communication apparatus, whether the information satisfies a predetermined condition that indicates a secure transmission environment;
    determining whether the portable communication apparatus is in a state in which communication with another portable communication apparatus is not permitted;
    in response to determining that both the information satisfying the predetermined condition and the portable communication apparatus being in the state in which communication is not permitted, changing the state of the portable communication apparatus to a first state in which transmission, of first identification information of the portable communication apparatus, to the another portable communication apparatus is permitted; and
    transmitting, by the control circuitry in response to determining that the information does not satisfy predetermined condition, second identification information of the portable communication apparatus to the another portable communication apparatus, wherein
    the second identification information is generated according to a hash value and a random value,
    the random value is changed for each predetermined time, and
    the hash value is calculated according to an identity resolving key that is known by the another communication apparatus so that the second identification information is recognizable by the another communication apparatus.

13. A non-transitory computer readable medium containing instructions stored therein, which when executed by a processor in a portable communication apparatus, causes the processor to execute a method comprising:
    acquiring information regarding position data or an external environment of the portable communication apparatus;
    determining whether the information satisfies a predetermined condition that indicates a secure transmission environment;
    in response to determining that both the information satisfying the predetermined condition and the portable communication apparatus being in the stale in which communication is not permitted, changing the state of the portable communication apparatus to a first state in which transmission, of first identification information of the portable communication apparatus, to the another portable communication apparatus is permitted; and
    transmitting, in response to determining that the information does not satisfy predetermined condition, second identification information of the portable communication apparatus to the another portable communication apparatus, wherein
    the second identification information is generated according to a hash value and a random value,
    the random value is changed for each predetermined time, and
    the hash value is calculated according to an identity resolving key that is known by the another communication apparatus so that the second identification information is recognizable by the another communication apparatus.

14. The communication method according to claim 12, wherein the first identification information is unique between the portable communication apparatus and the another portable communication apparatus.

15. The communication method according to claim 12, further comprising in response to the information not satisfying the predetermined condition, stopping transmission of the first identification information.

16. The communication method according to claim 12, wherein the predetermined condition includes a condition in which the position data falls within a predetermined geographical range.

17. The communication method according to claim 12, wherein the information on the external environment includes second information indicating that the another portable communication apparatus is in a range in which the portable communication apparatus is communicable.

18. The communication method according to claim 17, wherein the predetermined condition includes a condition in which the second information includes third information on a predetermined portable communication apparatus.

19. The communication method according to claim 12, wherein
    the information indicates that the external environment of the portable communication apparatus is detected by a sensor, and
    the predetermined condition includes a condition in which the external environment detected by the sensor is in a predetermined state.

20. The communication method according to claim 12, Wherein the second identification information continuously transmitted as the second identification information is changed according to the random value.

* * * * *